United States Patent Office 3,450,541
Patented June 17, 1969

3,450,541
RAPID QUANTITATIVE REMOVAL OF NATURAL STEROLS FROM LIPIDS
Daniel P. Schwartz, Takoma Park, and Charles R. Brewington, Adelphi, Md., and Louis H. Burgwald, Washington, D.C., assignors to the United States of America as represented by the Secretary of Agriculture
No Drawing. Filed June 29, 1966, Ser. No. 561,328
Int. Cl. A23c *15/14;* C11b *3/00*
U.S. Cl. 99—118
9 Claims

ABSTRACT OF THE DISCLOSURE

A process for separating naturally occurring sterols from a lipid mixture comprising dissolving the lipid mixture in a liquid hydrocarbon solvent to provide a lipid solution, attaching a film of aqueous solution of digitonin to an inert, solid support, contacting a film of the lipid solution with the film of digitonin solution, and collecting the contacted lipid solution.

---

A non-exclusive, irrevocable, royalty-free license in the invention herein described, throughout the world for all purposes of the United States Government, with the power to grant sublicenses for such purposes, is hereby granted to the Government of the United States of America.

This invention relates to separating sterols from other lipids. More particularly, this invention relates to a process for removing cholesterol from butterfat.

While the process of the present invention is exemplified with removal of cholesterol from a typical butterfat, this process is considered applicable to separation of naturally occurring (3$\beta$-hydroxy) sterols from a lipid mixture. Among these naturally occurring sterols are ergosterol and zymosterol from fungi, and stigmasterol, spinasterol and other phytosterols from plants.

The quantitative analysis of butterfat for hydroxylated constituents other than cholesterol is complicated by the presence of relatively high concentrations (0.25–0.35%) of this sterol. An accurate analysis of total components of the butterfat is useful in determining if there are differences in original composition, such as may be due to source or seasonal variation, and in following the changes in composition during processing and storage of the butterfat. The process of the present invention also provides a means of obtaining cholesterol-free butterfat for dietary research.

An object of the present invention is to provide a process for removing natural sterols from other lipids. Another object is to provide a process for removing cholesterol from butterfat. A further object is to provide a means for obtaining a cholesterol-free butterfat product. Still another object is to remove cholesterol without altering the content of other hydroxylated constituents or contaminating the butterfat with alcohol. Other objects and a fuller understanding of the invention will be apparent upon inspection of the specification and claims.

Cholesterol and phytosterols are known to combine with digitonin in alcoholic solution to form insoluble digitonides. Since a prerequisite in the present procedure is to avoid the use of hydroxy compounds, including alcohols, and there is a lack of a suitable mutual solvent for the lipids and digitonin, the separation of the sterol as a digitonide did not appear to be possible. We have discovered, however, a process under which the sterol can be quantitatively separated as the digitonide even though the lipids and the digitonin are dissolved in substantially non-miscible solvents.

According to the present invention naturally occurring sterols are separated from a lipid mixture by a process comprising dissolving the lipid mixture in a liquid hydrocarbon solvent to provide a lipid solution, attaching a film of aqueous solution of digitonin to an inert, solid support, contacting a film of the lipid solution with the film of digitonin solution, and collecting the contacted lipid solution.

In a particular embodiment of the present invention cholesterol is removed from butterfat by a process comprising dissolving a butterfat in a liquid hydrocarbon such as benzene or hexane to provide a cholesterol-containing butterfat solution, attaching a film of aqueous digitonin solution to an inert, solid support, contacting a film of the butterfat solution with the film of digitonin solution, and collecting the contacted hydrocarbon solution.

Whereas the usual ratio of digitonin to cholesterol utilized in quantitative precipitation of the sterol as the digitonide is a 10 to 1 molar ratio, cholesterol-free butterfat is obtained in the present process when the total digitonin in the aqueous film represents only a 2 to 1 molar ratio to the total cholesterol in the contacted butterfat solution.

The liquid hydrocarbon used to dissolve the lipids can be aliphatic or aromatic and can be selected from a wide range of boiling points, preferably having a boiling point below about 100° C. From a practical aspect, however, the predominantly hexane, aliphatic hydrocarbon solvent used in commercial vegetable oil extractors is a readily removed and recoverable solvent which is thus desirable for use in the present process. Benzene, an aromatic liquid hydrocarbon, is exemplified hereinafter as another lipid solvent in the process of the present invention.

Butterfat is the oily portion of milk of mammals. While the present process is illustrated as applied to butterfat from milk of the cow, the term is intended to apply to the oily portion of milk from the goat, sheep, horse or other mammal, large and small.

The digitonin for use in the process was given a preliminary extraction with portions of the kind of liquid hydrocarbon solvent employed as vehicle for the lipid. This precautionary step may not be necessary, but was arbitrarily adopted to lessen chances of contamination of the lipid product.

A preferred inert support is a fine granular material, and particularly preferred is a very fine, porous, granular material such as diatomaceous earth.

The following examples are presented to illustrate the practice of the invention, but is not intended to be in limitation thereof.

Example 1

Digitonin was extracted in a Soxhlet for 8 hours with redistilled benzene, then air dried. A stock solution of the glycoside was prepared by dissolving (with heat) 60 mg. (49$\mu$ moles) per ml. of distilled water. On cooling, the digitonin remains in solution for approximately one hour before visible precipitation occurs. A slight turbidity always prevails in the solution, but has no effect on the results.

One ml. of the digitonin solution was pipetted into a 2 inch mortar and ground onto 2 g. of a highly porous diatomaceous earth (Celite 545). After grinding a few minutes, the mortar was scraped with a spoon so that all of the diatomaceous earth was removed from the bottom and sides of the mortar and collected in a pile and then reground. The grinding should be thorough, so that the digitonin is distributed uniformly throughout the inert support material.

The reground diatomaceous earth was transferred from the mortar to a 1.8 x 13 cm. chromatography tube containing about 5 ml. of redistilled hexane. The column was packed wtih the aid of a tamping rod using moderate pressure. Excess hexane was removed.

Butterfat was dissolved in benzene to provide a 30% solution based on weight butterfat per volume. Ten ml. of the butterfat solution was added to the chromatography column. Nitrogen gas pressure was used to expedite the flow of solution through the column at a rate not exceeding 0.75 ml. per minute. When the last of the butterfat solution had just entered the inert material in the column the pressure was removed and the sides of the tube washed down with 1 ml. of solvent. The wash was repeated twice. Following the third wash, 10 ml. of benzene was added to wash the residual butterfat from the column.

The efficiency of removal of cholesterol from butterfat by the digitonin column was checked by reacting the effluent from the column directly with a colored acid chloride capable of quantitatively esterifying the hydroxyl constituents in the fat. The colored esters are subsequently isolated lipid-free, separated into classes by column chromatography, and each class subjected to thin layer chromatography (TLC). No band was observed in the position normally occupied by the cholesterol derivative in the class separation on the column, and no spot for the cholesterol derivative was observed when the bands from that column were subjected to TLC.

Example 2

The process of Example 1 was repeated with the exception that the 30% (w./v.) butterfat solution was a hexane solution. A portion of the eluate from the column was assayed and found to contain no detectable cholesterol. The hexane was removed from the remainder of the eluate to provide a cholesterol-free butterfat product.

Example 3

A digitonin-on-diatomaceous earth column was prepared as in Example 1. Cholesterol (purified via the dibromide) was added to tricaprylin in hexane solution in an amount to provide 0.30% concentration of cholesterol based on tricaprylin content. A volume of the solultion calculated to contain 24µ moles of cholesterol was passed through the column. The fat obtained from the effluent was saponified and the unsaponifiable matter separated. A cholesterol assay on the unsaponified matter was zero.

The examples demonstrate the rapid quantitative removal of a sterol from a lipid mixture by the process of the present invention. The application of the present process to large amounts of lipids on a batch, semi-continuous or continuous process basis is considered to be a matter of engineering design and is within the scope of the invention as disclosed in the specification and as defined in the claims.

We claim:
1. A process for removing a naturally occurring sterol from a lipid mixture without altering the content of other hydroxylated constituents or contaminating the lipid mixture with alcohol comprising attaching a film of aqueous solution of digitonin to an inert, solid support, dissolving the lipid mixture in a liquid hydrocarbon solvent to provide a lipid solution, contacting a film of the lip solution with said film of digitonin solution, and collecting the contacted lipid solution.

2. The process of claim 1 in which the sterol is cholesterol and the lipid is butterfat.

3. The process of claim 2 in which the inert solid support is diatomaceous earth.

4. The process of claim 3 in which the liquid hydrocarbon solvent has a boiling point below about 100° C.

5. A process for preparing a cholesterol-free butterfat to remove cholesterol without altering the contents of other hydroxylated constituents or contaminating the butterfat with alcohol comprising attaching a film of aqueous digitonin solution to an inert, solid support, dissolving a butterfat in a liquid hydrocarbon solvent to provide a cholesterol-containing butterfat solution, contacting a film of the butterfat solution with said film of digitonin solution, the digitonin in the total of said film of digitonin solution being present in a molar ratio of at least about 2 to 1 based on cholesterol in the total of said film of butterfat solution, collecting the contacted butterfat solution and separating said solvent to provide a cholesterol-free butterfat product.

6. The process of claim 5 in which the inert solid support is diatomaceous earth.

7. The process of claim 5 in which the liquid hydrocarbon solvent has a boiling point below about 100° C.

8. The process of claim 7 in which the hydrocarbon solvent is hexane.

9. The process of claim 7 in which the hydrocarbon solvent is benzene.

References Cited

UNITED STATES PATENTS

| | | | |
|---|---|---|---|
| 2,321,884 | 6/1943 | Allam | 210—36 X |
| 3,110,712 | 11/1963 | Hill et al. | 210—36 X |

OTHER REFERENCES

Sperry, W. M., et al.: "Journal of Biological Chemistry," vol. 187, 1950, pp. 97–106, copy in Scientific Library.

MAURICE W. GREENSTEIN, *Primary Examiner.*

U.S. Cl. X.R.

99—164; 260—397.25